(12) United States Patent
Nakao

(10) Patent No.: US 7,726,202 B2
(45) Date of Patent: Jun. 1, 2010

(54) TERTIARY MODE VIBRATION TYPE CORIOLIS FLOWMETER

(75) Inventor: Yuichi Nakao, Tokyo (JP)

(73) Assignee: Oval Corporation, Tokyo (JP)

( * ) Notice: Subject to any disclaimer, the term of this patent is extended or adjusted under 35 U.S.C. 154(b) by 597 days.

(21) Appl. No.: 11/658,916

(22) PCT Filed: Jan. 13, 2005

(86) PCT No.: PCT/JP2005/000628

§ 371 (c)(1),
(2), (4) Date: Jan. 30, 2007

(87) PCT Pub. No.: WO2006/030543

PCT Pub. Date: Mar. 23, 2006

(65) Prior Publication Data

US 2009/0038412 A1    Feb. 12, 2009

(30) Foreign Application Priority Data

Sep. 17, 2004    (JP)    ............... 2004-270743

(51) Int. Cl.
*G01F 1/84*    (2006.01)
(52) U.S. Cl. ................................. 73/861.355
(58) Field of Classification Search ............. 73/861.355
See application file for complete search history.

(56) References Cited

U.S. PATENT DOCUMENTS 3,355,944 A  * 12/1967  Sipin .................... 73/861.355
4,381,680 A  *  5/1983  Shiota .................. 73/861.355
4,777,833 A  * 10/1988  Carpenter ............. 73/861.355
4,852,410 A  *  8/1989  Corwon et al. ........ 73/861.355
4,895,030 A  *  1/1990  Bergamini et al. ..... 73/861.355
5,323,658 A  *  6/1994  Yao et al. .............. 73/861.357
6,138,517 A  * 10/2000  Laursen et al. ........ 73/861.355
6,526,839 B1 *  3/2003  Barger et al. .......... 73/861.356
6,722,209 B1 *  4/2004  Fan et al. .............. 73/861.355
6,748,813 B1 *  6/2004  Barger et al. .......... 73/861.355
7,032,462 B2 *  4/2006  Barger et al. .......... 73/861.355
7,168,329 B2 *  1/2007  Bell et al. ............. 73/861.355
7,437,949 B2 * 10/2008  Nakao et al. .......... 73/861.355
2001/0035055 A1* 11/2001  Drahm et al. ......... 73/861.355

FOREIGN PATENT DOCUMENTS

| JP | 07-134053   | 5/1995 |
| JP | 2000-503770 | 3/2000 |
| JP | 2003-185484 | 7/2003 |
| WO | 97/26508    | 7/1997 |

* cited by examiner

*Primary Examiner*—Harshad Patel
(74) *Attorney, Agent, or Firm*—Wenderoth, Lind & Ponack, L.L.P.

(57) ABSTRACT

A tertiary mode vibration type Coriolis flowmeter includes a flow tube, a drive device driving the flow tube, and a pair of vibration detecting sensors detecting a phase difference in proportion to a Colioris force acting on the flow tube. The drive device drives the flow tube by bending vibration in a tertiary mode. The flow tube further comprises an approximately loop-shaped body part. A pair of parallel leg parts deflected in a direction approximately orthogonal to the vibrating direction of both end parts of the body part, namely, to the outside of the both end parts are formed continuously with the both end parts of the body part. Fixed end parts supporting the flow tube are formed at the leg parts.

5 Claims, 19 Drawing Sheets

(a)

(a)

(b)

(a)

SYMBOL O INDICATES VIBRATION ANTINODES
(VIBRATING DIRECTION IS PERPENDICULAR
TO THE PLANE OF THE DRAWING).
SYMBOL × INDICATES VIBRATION NODES.

(b)

(a)

(b)

(c)

(a)

(b)

(c)

(a)       (b)       (c)       (d)

(a)       (b)       (c)

(d)       (e)       (f)

(a) (b) (c)

(d) (e) (f) (g)

(h) (i)

(j) (k)

(a)

(b)

(c)

(d)

(a) ht/H=1.50

(b) ht/H=1.75

(c) ht/H=2.00

(d) ht/H=2.25

(a)
ht/H=2.50

ANGULAR DISPLACEMENT
OF PORTIONS A IS MAXIMUM (b)
ht/H=2.75

(c)
ht/H=3.00

ANGULAR DISPLACEMENT OF
PORTIONS A IS REDUCED, AND
DISPLACEMENT THEREOF IS INCREASED

DISPLACEMENT OF PORTIONS B
BECOMES LARGER AND LARGER (a)

ht/H=4.00

(b)

ht/H=5.00

TERTIARY MODE VIBRATION TYPE CORIOLIS FLOWMETER

TECHNICAL FIELD

The present invention relates to a Coriolis flowmeter equipped with at least one flow tube, and more specifically, to a tertiary mode vibration type Coriolis flowmeter in which the flow tube is formed in a substantially T-shaped configuration and is driven by bending vibration in a tertiary mode.

BACKGROUND ART

In a Coriolis flowmeter, a tube through which a fluid to be measured flows is supported at one end or both ends thereof, and vibration is applied to a portion of the tube around the supporting point in a direction vertical (orthogonal) to the flowing direction of the tube (hereinafter, a tube to which vibration is applied is referred to as a flow tube). The Coriolis flowmeter is a mass flowmeter, which utilizes the fact that the Coriolis forces applied to the flow tube when vibration is thus applied thereto, are proportional to a mass flow rate. The Coriolis flowmeter, which is well known, is roughly classified into a straight tube type and a bent tube type in terms of flow tube structure.

In a Coriolis flowmeter of the straight tube type, when vibration is applied to a straight tube, whose both ends are supported, in a direction vertical (orthogonal) to the straight-tube center portion axis, a difference in displacement due to the Coriolis forces is generated between the support portions and the central portion of the straight tube. In other words, a phase difference signal is obtained, and, based on this phase difference signal, the mass flow rate is detected. The straight tube type Coriolis flowmeter thus constructed has a simple, compact, and solid structure. On the other hand, there arises a problem in that it is difficult to achieve high detection sensitivity.

In contrast, the bent tube type Coriolis flowmeter is superior to the straight tube type Coriolis flowmeter from a viewpoint that the bent tube type Coriolis flowmeter allows selection of a shape for effectively obtaining the Coriolis forces. In fact, the bent tube type Coriolis flowmeter is capable of performing mass flow rate detection with high sensitivity. Known examples of the bent tube type Coriolis flowmeter include one equipped with a single flow tube (see, for example, JP 4-55250 A), one equipped with two flow tubes arranged in parallel (see, for example, JP 2939242 B), and one equipped with a single flow tube in a looped state (see, for example, JP 2951651 B).

In a Coriolis flowmeter, forming the flow tube by a single path without being branched off is the best method of solving a problem of clogging in a small diameter sensor. When measuring a fluid having compressibility or discontinuous fluids differing in density and viscosity, it is impossible to effect flow separation in a stable manner if the flow is branched off. From this viewpoint also, it is desirable to form the flow tube by a single flow path. Further, when the flow tube is formed exclusively in one and the same plane (i.e., a single plane), the production of the flow tube is facilitated since the configuration and structure involved are the simplest, which proves effective when reproducibility in form at low cost is required.

However, in a conventional Coriolis flowmeter formed by a single flow path, which does not adopt an opposing construction to cancel vibration, leakage of vibration from the fixed ends to the exterior of the mass flowmeter occurs when the flow tube is vibrated in a tertiary mode or an even-number mode, resulting in generation of zero-point drift or span fluctuation depending upon changes in piping conditions. Further, even in a vibration system using a counter balancer for the purpose of mitigating vibration leakage, a change in vibration leakage is caused by a change in density, resulting in a deterioration in terms of instrumental error property.

As stated above, a counter balancer is usually adopted in order to mitigate vibration leakage. However, in a Coriolis flowmeter utilizing bending vibration of a single tube, the influences of the counter balancer system in terms of density, temperature, and vibration are inevitable.

SUMMARY OF THE INVENTION

The present invention has been made in view of the above problems in the prior art. It is an object of the present invention to provide a tertiary mode vibration type Coriolis flowmeter capable of mitigating vibration leakage.

In order to achieve the object of the present invention, a tertiary mode vibration type Coriolis flowmeter of the present invention includes: at least one flow tube, a drive device for driving the flow tube, and a pair of vibration detection sensors for detecting a phase difference in proportion to a Coriolis force acting on the flow tube. The drive device drives the flow tube by bending vibration in a tertiary mode, and the flow tube has a substantially loop-shaped body part. A pair of parallel leg parts are formed to be continuous with both end parts of the body parts and to be deflected in a direction substantially orthogonal to the vibrating direction of both end parts of the body part and to the outside of the both end parts, with fixed end parts supporting the flow tube being formed at the leg parts.

In order to achieve the object of the present invention, a tertiary mode vibration type Coriolis flowmeter according to the present invention is characterized in that, in the tertiary mode vibration type Coriolis flowmeter described above, the fixed end parts of the leg parts are arranged at positions in close proximity to each other within one and the same plane.

In order to achieve the object of the present invention, a tertiary mode vibration type Coriolis flowmeter according to the present invention, is characterized in that the following conditions are satisfied: (1) $0.03 < H/W < 1$, (2) $0.005 < w/W < 0.48$, and (3) $0 < ht/H < 2.75$, where W is the width of the body part, H is the height of the body part, ht is the height of the leg parts, w is the fixed end width consisting of the distance between the fixed end parts, H/W is the ratio of the height H of the body part to the width W of the body part, w/W is the ratio of the fixed end width w to the width W of the body part, and ht/H is the ratio of the height ht of the leg parts to the height H of the body part.

According to the present invention having the features described above, the flow tube is formed in a substantially T-shaped configuration, and the flow tube is driven by bending vibration in a tertiary mode, in which vibration is stabilized with minimum energy consumption. As a result, it is possible to convert the bending vibration at both end parts of the body part of the flow tube into twisting vibration at the leg parts provided so as to be continuous with both end parts. Further, according to the present invention, it is possible to generate twisting stresses in opposite directions in the leg parts arranged in parallel. As a result, it is possible to substantially cancel vibration leakage. By arranging both fixed end parts of the leg parts at positions in close proximity to each other within one and the same plane (i.e., in a single plane), it is possible to cancel vibration leakage in a more satisfactory manner. Further, according to the present invention, by forming the flow tube in a configuration satisfying a predetermined condition, it is possible to mitigate vibration leakage.

In driving in a tertiary mode, there is generated, as the Coriolis force, a Coriolis force of a quaternary-mode nature. However, in the flow tube as a whole, there is generated, due to the overall rigidity, a movement of a secondary-mode nature (i.e. twisting vibration). To achieve a reduction in rigidity with respect to the movement of a secondary-mode nature (i.e. twisting vibration), it is necessary to reduce the distance between the fixed ends on the upstream and downstream sides and to achieve a reduction in rigidity with respect to bending (to obtain an effect like that of a rotary free support end). This helps to achieve an improvement in terms of Coriolis force detection sensitivity.

Consideration of a tertiary bending vibration from the viewpoint of vibration leakage reveals that in order to convert bending vibration into twisting vibration at the flow tube end portions, it is desirable to deflect the flow tube by 90°. To efficiently reduce the remaining twisting vibration, it is desirable to bring the parallel rotation shafts rotating in opposite directions as close to each other as possible, with the fixed ends thereof existing in one and the same plane.

In this way, according to the present invention, it is possible to mitigate vibration leakage. Further, it is possible to minimize zero point drift and span fluctuation due to changes in piping conditions. Further, according to the present invention, it is possible to provide a more satisfactory Coriolis flowmeter.

BRIEF DESCRIPTION OF THE DRAWINGS

FIG. 1 is a diagram showing a tertiary mode vibration type Coriolis flowmeter according to an embodiment of the present invention, in which FIG. 1a is a front view of a casing, and FIG. 1b is a schematic view showing the inner construction thereof.

DETAILED DESCRIPTION OF THE INVENTION

In the following, embodiments of the present invention will be described with reference to the drawings.

Figure 1:
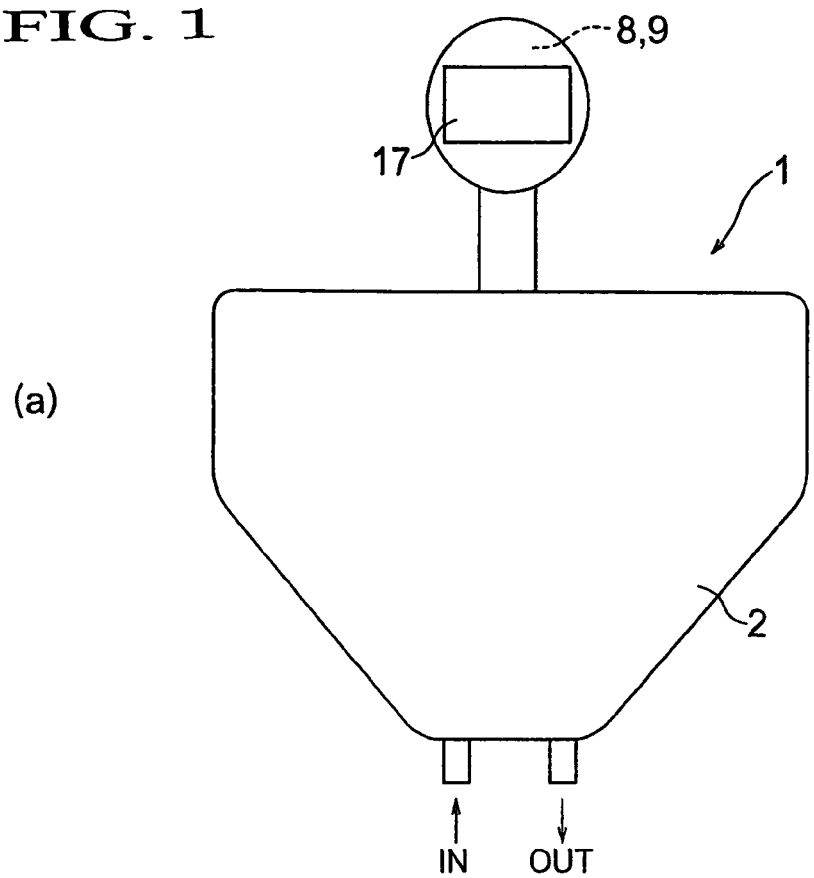
Figure 1:
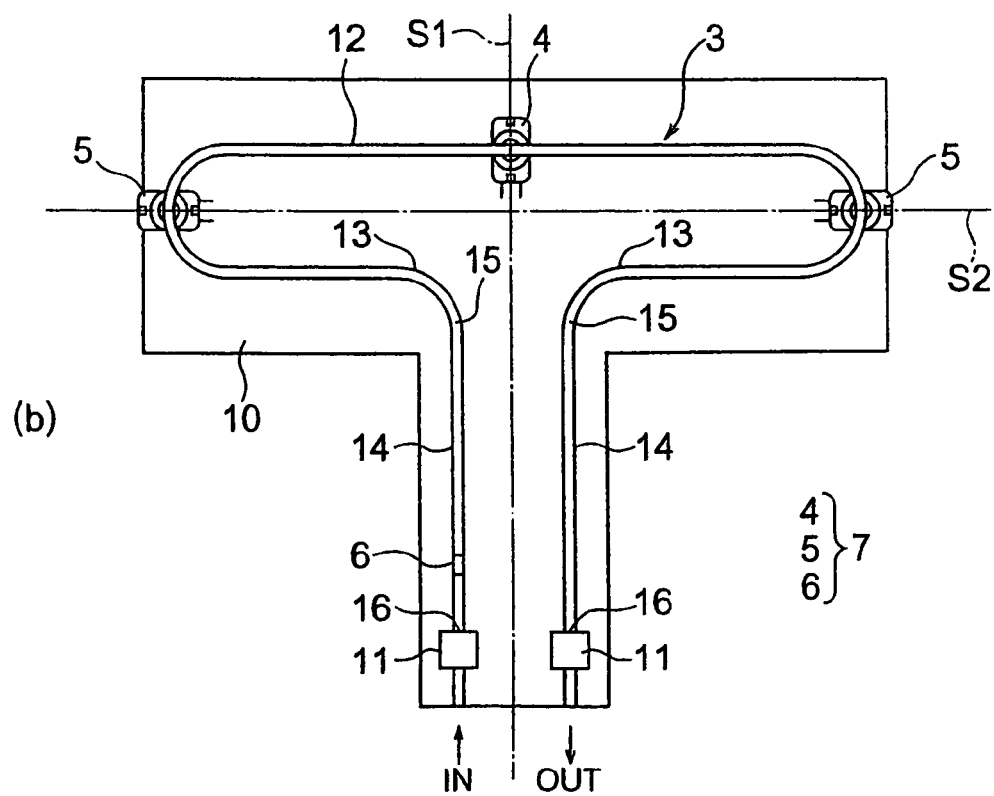

FIG. 1 shows a tertiary mode vibration type Coriolis flowmeter according to an embodiment of the present invention.

Figure 2:
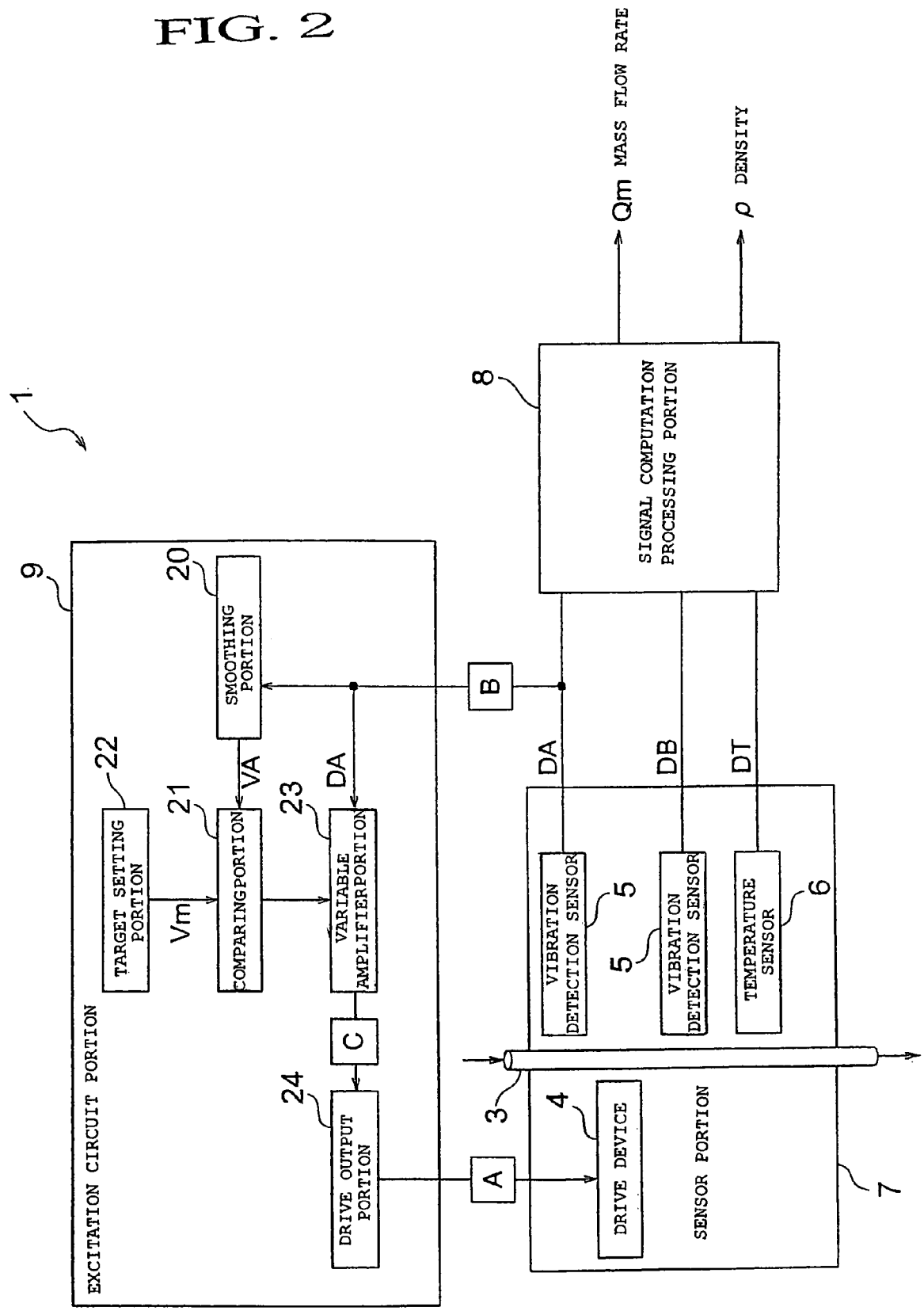
FIG. 2 is a block diagram showing a sensor portion, a signal processing portion, and an excitation circuit portion of a tertiary mode vibration type Coriolis flowmeter.

FIG. 1 shows a tertiary mode vibration type Coriolis flowmeter according to the present invention, in which FIG. 1a is a front view of a casing of a tertiary mode vibration type Coriolis flowmeter, and FIG. 1b is a schematic view of the internal construction of the tertiary mode vibration type Coriolis flowmeter. FIG. 2 is a block diagram showing the relationship between a sensor portion, a signal processing portion, and an excitation circuit portion in a tertiary mode vibration type Coriolis flowmeter.

In FIGS. 1 and 2, a tertiary mode vibration type Coriolis flowmeter 1 according to the present invention includes: a casing 2; a single flow tube 3 accommodated in the casing 2; a sensor portion 7 having a drive device 4, a pair of vibration detecting sensors 5, 5 and a temperature sensor 6; a signal computation processing portion 8 for performing computation processing on mass flow rate, etc. based on a signal from the sensor portion 7; and an excitation circuit portion 9 for exciting the drive device 4. In the following, these components will be described.

The casing 2 has a structure resistant to bending and torsion. Further, the casing 2 is formed in a size large enough to accommodate the flow tube 3 and a stationary member 10 arranged parallel to a plane formed by the flow tube 3. Further, the casing 2 is formed so as to be capable of protecting the main portion of the flowmeter such as the flow tube 3. The casing 2 is filled with an inert gas, such as argon gas. Due to the filling with the inert gas, condensation on the flow tube 3, etc. is prevented. The exterior structure of the casing 2 of this embodiment is formed in accordance with the shape of the flow tube 3 (herein, described as an example).

The stationary member 10 to which the flow tube 3 is arranged parallel is formed as a flat plate, a part of which is fixed to the casing 2. Mounted to the stationary member 10 by appropriate means are support portions 11 for supporting and fixing the inlet port side and the outlet port side of the flow tube 3.

The flow tube 3 has a substantially loop-shaped (i.e. substantially elliptical) body part 12 and a pair of parallel leg parts 14, 14 continuous with the end parts 13, 13 of the body part 12, and is formed in a T-shaped configuration in plan view (the reason for adopting the T-shaped configuration will be given below). The leg parts 14, 14 are formed to be continuous with the end parts 13, 13 so as to extend in a direction substantially orthogonal to the vibrating direction of the end parts 13, 13 and so as to be deflected to the outer side of the end parts 13, 13. Reference numeral 15 indicates the terminal neck portions of 1/4 arcs continuous with the end parts 13, 13. The leg parts 14, 14 have fixed end parts 16, 16 for supporting the flow tube 3 itself. The fixed end parts 16, 16 are arranged at positions in close proximity to each other within one and the same plane.

A measurement fluid flowing into one leg part 14 of the flow tube 3 flows through the body part 12 before flowing out of the other leg part 14. The material of the flow tube 3 is one usually adopted in this technical field, such as stainless steel, hastelloy, or titanium alloy.

The drive device 4 forming the sensorportion 7 serves to vibrate the flow tube 3 in a tertiary mode, and is equipped with a coil (of which a reference numeral is omitted) and a magnet (of which a reference numeral is omitted). The drive device 4 is provided in the first axis S1 and at the center of the curved portion of the flow tube 3. In other words, the drive device 4 is provided at the center of the body part 12 so as to be situated within a range of a central antinode of three antinodes generated by the tertiary mode vibration.

The coil of the drive device 4 is mounted to the stationary member 10. Further, although not specifically shown, an FPC (i.e. flexible printed circuit) or an electric wire is led out from this coil. The magnet of the drive device 4 is mounted to the flow tube 3 by using a dedicated mounting tool.

When an attracting action is generated in the drive device 4, the magnet is inserted into the coil, with the result that the flow tube 3 is brought into close proximity to the stationary member 10. In contrast, when a repelling action is generated, the flow tube 3 is spaced apart from the stationary member 10. The drive device 4 is constructed so as to drive the flow tube 3 alternately in a direction perpendicular to the plane of FIG. 1.

The vibration detecting sensors 5, 5 forming the sensor portion 7 are sensors which detect vibration of the flow tube 3 and, at the same time, detect a phase difference that is proportional to Coriolis forces acting on the flow tube 3, with each of the vibration detecting sensors 5, 5 being equipped with a coil (of which a reference numeral is omitted) and a magnet (of which a reference numeral is omitted). (Apart from this, it is also possible to adopt, for example, an acceleration sensor, optical means, a capacitance type, or a distortion type (i.e. piezoelectric type), which detects one of displacement, velocity, and acceleration.)

The vibration detection sensors 5, 5, constructed as described above, are arranged along the longitudinal axis S2 of the body part 12. The vibration detection sensors 5, 5 are arranged at positions within the ranges of the antinodes adjacent to and on both sides of the central antinode where a phase difference in proportion to a Coriolis force can be detected. The vibration detection sensors 5, 5 are arranged at positions off the nodes generated when the flow tube 3 is vibrated by vibration in a tertiary mode.

The respective coils of the vibration detecting sensors 5, 5 are mounted to the stationary member 10. Further, although not specifically shown, an FPC (i.e. flexible printed circuit) or an electric wire is led out from each coil. The respective magnets of the vibration detecting sensors 5, 5 are mounted to the flow tube 3 by using a dedicated mounting tool.

In this embodiment, the coils of the drive device 4 and the vibration detection sensors 5, 5 have an appropriate weight and require electric wires, which are not shown, or FPC (i.e. flexible print circuit) wiring (of which a wiring system is not shown), and therefore are mounted at predetermined positions on the stationary member 10 as described above. As a result, the influence of the flow tube 3 on the vibration is mitigated as much as possible.

In the present invention, it is also possible to reverse the mounting of the coils and the magnets (that is, to mount the coils to the flow tube 3 and to mount the magnets to the stationary member 10).

Although not specifically shown, a substrate or the like is provided inside the tertiary mode vibration type Coriolis flowmeter 1 according to the present invention. Further, connected to the substrate is a wire harness led out to the exterior of the tertiary mode vibration type Coriolis flowmeter 1.

The temperature sensor 6, which constitutes apart of the sensor portion 7, serves to effect temperature compensation on the tertiary mode vibration type Coriolis flowmeter 1, and is mounted to the flow tube 3 by an appropriate means. To be more specific, the temperature sensor 6 is mounted, for example, in the vicinity of a portion on the inflow port side and supported by and fixed to the support portion 11, 11, that is, in the vicinity of the end portion 16, 16. The FPC (i.e. flexible printed circuit), which is not shown, or the electric wire led out from the temperature sensor 6 is connected to the above-mentioned substrate, which is not shown.

Wiring and connection is effected on the signal computation processing portion 8 so as to allow input of a detection signal DA from one vibration detecting sensor 5 regarding deformation of the flow tube 3, a detection signal DB from the other vibration detecting sensor 5 regarding deformation of the flow tube 3, and a detection signal DT from the temperature sensor 6 regarding the temperature of the flow tube 3. The signal computation processing portion 8 is constructed such that the computation of a mass flow rate Qm and a density $\rho$ are effected based on the detection signals DA, DB, and DT input from the sensor portion 7. Further, the signal computation processing portion 8 is constructed such that the mass flow rate Qm and the density $\rho$ obtained through computation are output to a display device 17.

The excitation circuit portion 9 includes a smoothing portion 20, a comparing portion 21, a target setting portion 22, a variable amplification portion 23, and a drive output portion 24. Further, in vibrating the flow tube 3 in the tertiary mode, the excitation circuit 9 forms a positive feedback loop. In the smoothing portion 20, wiring is effected so as to extract the detection signal DA from one vibration detecting sensor 5 (or the other vibration detecting sensor 5). Further, the smoothing portion 20 has a function of effecting rectification and smoothing on the input detection signal DA and outputs a DC voltage VA that is proportional to the amplitude thereof. The comparing portion 21 has a function of comparing the DC voltage VA from the smoothing portion 20 with a target set voltage Vm output from the target setting portion 22 and controlling the gain of the variable amplification portion 23 so as to adjust the amplitude of a resonance vibration to the target set voltage.

A construction of the components from the smoothing portion 20 to the drive output portion 24 is the same as that in the conventional case in which vibration is controlled by a positive feedback loop. However, in the tertiary mode vibration type Coriolis flowmeter 1 of the present invention, to obtain a tertiary mode vibration, the phase of the signal waveform of the positive feedback loop is converted to an opposite phase. That is, in the portion A of FIG. 2, an output line led out from the drive output portion 24 is inversely connected to convert the phase of the output waveform to an opposite phase. Alternatively, in a portion B of FIG. 2, the signal line of the detection signal DA input to the excitation circuit portion 9 is inversely connected to convert the phase of the signal waveform to an opposite phase. Alternatively, in a portion C of FIG. 2, wiring led out from the variable amplification portion 23 is inversely connected to convert the phase of the amplification waveform to an opposite phase. Alternatively, in a portion A of FIG. 2, the phase of the output sent out from the drive output portion 24 is converted to an opposite phase by using an inverter. Alternatively, in the portion B of FIG. 2, the phase of the detection signal DA input to the excitation circuit portion 9 is converted to an opposite phase by using an inverter. Alternatively, in the portion C of FIG. 2, the phase of the output sent out from the variable amplification portion 23 is converted to an opposite phase by using an inverter. (To be more specific, the drive device 4 and the vibration detecting sensors 5, 5 are arranged at the aforementioned positions, and, further, the displacement polarity of the drive device 4 and the displacement polarity of the vibration detecting sensors 5, 5 are adjusted so as to be in opposite phase with each other. Further, in the positive feedback loop of the excitation circuit portion 9, conversion is effected on each of the displacement polarities which is in opposite phase with each other, so as to be converted in phase with each other.)

When, in the above-mentioned construction, measurement fluid is caused to flow through the flow tube 3, and the drive device 4 is driven to vibrate the flow tube 3 in the tertiary mode, the mass flow rate Qm is calculated by the signal computation processing portion 8 based on the phase difference in the flow tube vibration generated by Coriolis forces at points corresponding to the vibration detecting sensors 5, 5. Further, in the tertiary mode vibration type Coriolis flowmeter of this embodiment, the density ρ is also calculated.

As described above with reference to FIGS. 1 and 2, in the tertiary mode vibration type Coriolis flowmeter 1 of the present invention, the flow tube 3 is formed in a substantially T-shaped configuration, and is driven by bending vibration in a tertiary mode in which the vibration is stabilized with minimum energy consumption. Therefore, it is possible to convert the bending vibration at the end parts 13, 13 of the body part 12 of the flow tube 3 into a twisting vibration at the leg parts 14, 14 continuous with the end parts 13, 13. Twisting stresses in opposite directions are generated in the parallel leg parts 14, 14, thereby substantially canceling vibration leakage. Thus, in the tertiary mode vibration type Coriolis flowmeter 1 of the present invention, it is possible to reduce vibration leakage as compared with the prior art technique. As can be seen from the description below, by positioning the fixed end parts 16, 16 of the leg parts 14, 14 in close proximity to each other within one and the same (single) plane, it is possible to cancel vibration leakage in a more satisfactory manner.

Further, in the tertiary mode vibration type Coriolis flowmeter 1 of the present invention, the flow tube 3 constitutes a single flow path and includes no counter balancer, so that there is no change in vibration leakage if there is a change in density, making it possible to constantly maintain a balanced state. Since there is no need to perform balancing, it is possible to cut down a production cost and to attain stabilization in quality for a long period of time. Further, since the flow tube 3 is a single flow path, there is no need to provide a known brace bar. Since no brace bar is needed, there is no need to perform brazing, with the result that it is possible to cut down the production cost.

Since the stress acting on the fixed end parts 16, 16 is in a twisting direction and uniform over the entire periphery with respect to the circumferential direction of the tube, it is possible to effect connection to the tubing or the anchor by means of a mechanical seal. Further, since it is possible to effect the connection by means of a simple mechanical seal, it is possible to realize a structure in which the flow tube can be exclusively attached and detached. Further, by using pass-through type bulk head connectors for the fixed end parts 16, 16, it is possible to form a flow tube in which the portion in contact with the liquid totally allows replacement, thus providing a Coriolis flowmeter suitable for medical uses and food-related industry.

Next, optimum geometrical conditions for the flow tube will be discussed with reference to FIGS. 3 through 20.

Figure 3:
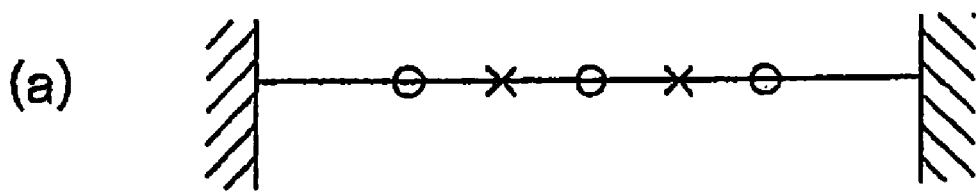
FIG. 3 is a diagram systematically showing a classification of Coriolis flowmeters driven in a tertiary mode (i.e. straight tube type tertiary mode).
Figure 3:
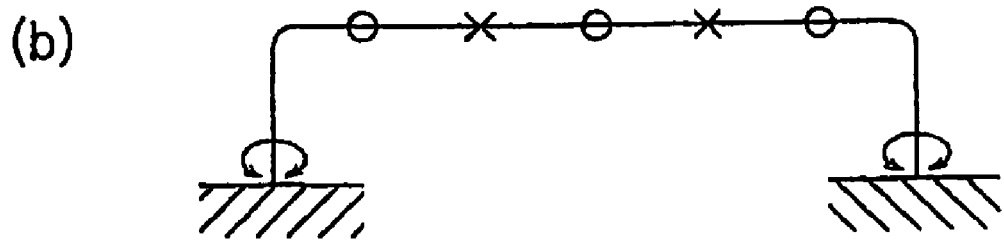

FIGS. 3(a) through 9(d) systematically show classifications of Coriolis flowmeters driven in a tertiary mode. As examples in which the flow path is formed exclusively by bending vibration, FIG. 3(a) shows a straight tube type tertiary mode, FIG. 4(a) shows a U-shaped tertiary mode (with the fixed ends in the same plane), and FIG. 5(a) shows a loop-shaped tertiary mode (with the fixed ends extending in opposite directions in the same axis).

In the straight tube type tertiary mode of FIG. 3(a), the vibrating direction of the both end parts is perpendicular to the plane of FIG. 3. FIG. 3(b) shows an example in which tube paths are added so as to be perpendicular to the vibrating direction in this case. The added tube paths undergo twisting vibration by bending vibration of the end parts. Actually, however, the bending vibration is often also propagated as it is to the tube paths added.

Figure 4:
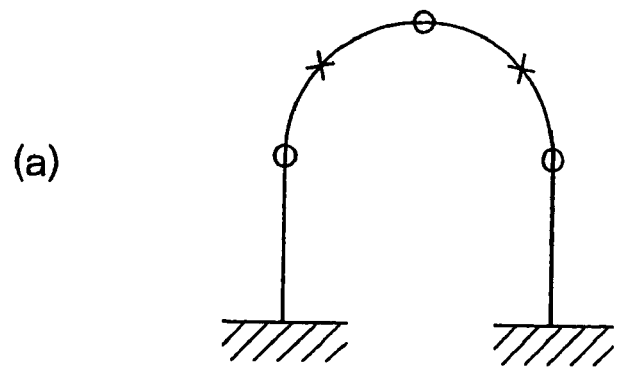
FIG. 4 is a diagram systematically showing a classification of Coriolis flowmeters driven in a tertiary mode (i.e. U-shaped type tertiary mode).
Figure 4:
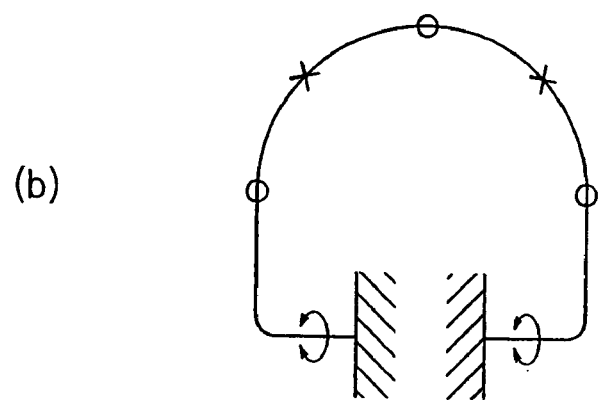
Figure 4:
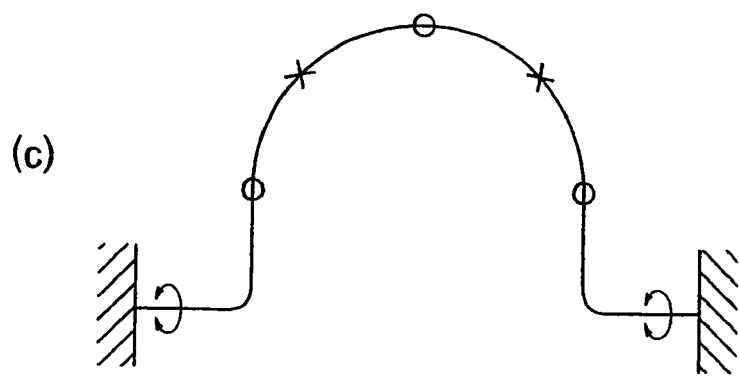

The vibrating direction of the end parts in the U-shaped tertiary mode (with the fixed ends in the same plane) of FIG. 4(a) is perpendicular to the plane of FIG. 4. FIG. 4(b) shows an example in which tube paths are added perpendicularly to the vibrating direction in this case and inwardly, and FIG. 4(c) shows an example in which tube paths are added outwardly. In all examples, the tube paths added undergo twisting vibration by the bending vibration of the end parts. FIGS. 6(a) through 6(d) show structural examples derived from FIG. 4(b). FIGS. 7(a) through 7(f) show structural examples derived from FIG. 4(c).

Figure 5:
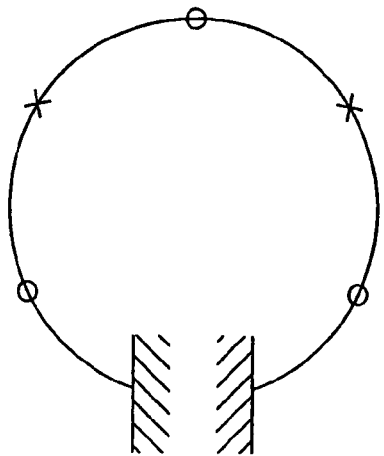
FIG. 5 is a diagram systematically showing a classification of Coriolis flowmeters driven in a tertiary mode (i.e. loop-shaped type tertiary mode).
Figure 5:
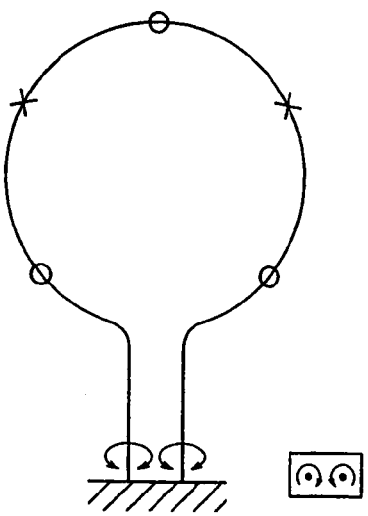
Figure 5:
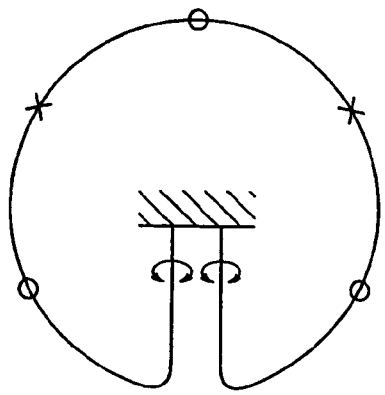
Figure 6:
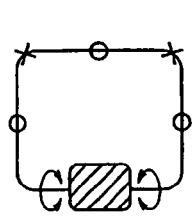
FIG. 6 is a diagram showing structural examples derived from FIG. 4(b).
Figure 6:
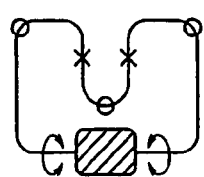
Figure 6:
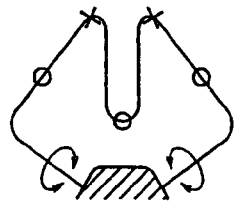
Figure 6:
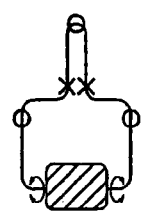
Figure 7:
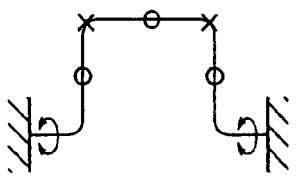
FIG. 7 is a diagram showing structural examples derived from FIG. 4(c).
Figure 7:
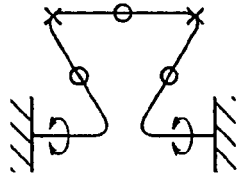
Figure 7:
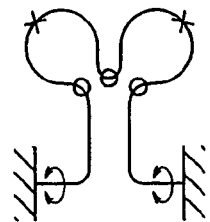
Figure 7:
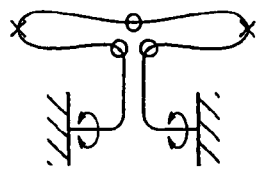
Figure 7:
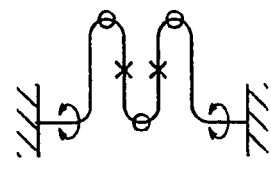
Figure 7:
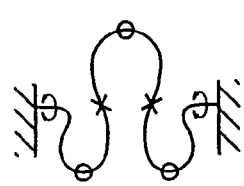

The vibrating direction of the end parts in the loop-shaped tertiary mode (with the fixed ends extending in opposite directions in the same axis) of FIG. 5(a) is perpendicular to the plane of FIG. 5. FIG. 5(b) shows an example in which tube paths are added perpendicularly to the vibrating direction in this case and outwardly, and FIG. 5(c) shows an example in which tube paths are added inwardly. In all examples, the tube paths added undergo twisting vibration by the bending vibration of the end parts. FIGS. 8(a) through 8(k) show structural examples derived from FIG. 5(b). FIGS. 9(a) through 9(d) show structural examples derived from FIG. 5(c).

Figure 8:
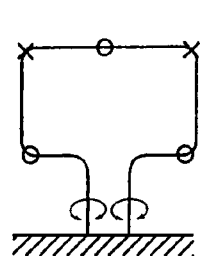
FIG. 8 is a diagram showing structural examples derived from FIG. 5(b).
Figure 8:
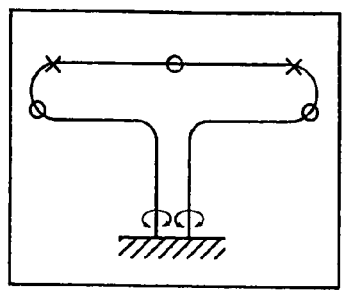
Figure 8:
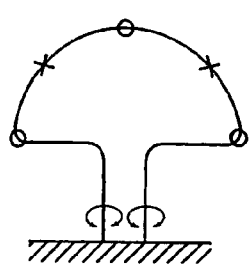
Figure 8:
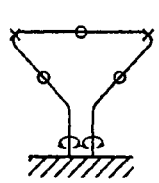
Figure 8:
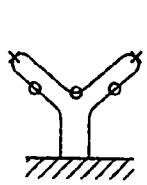
Figure 8:
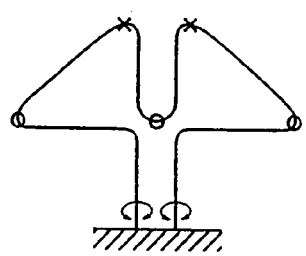
Figure 8:
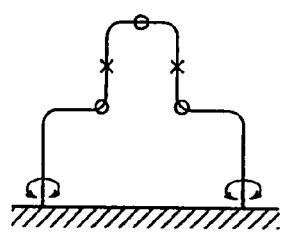
Figure 8:
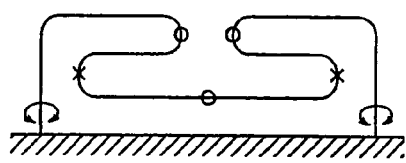
Figure 8:
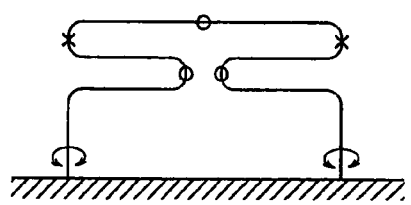
Figure 8:
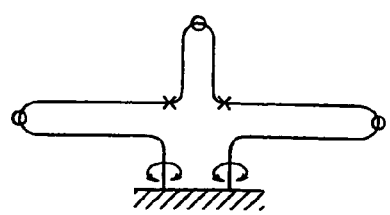
Figure 8:
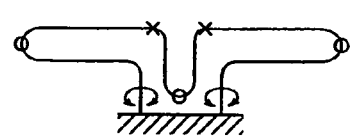
Figure 9:
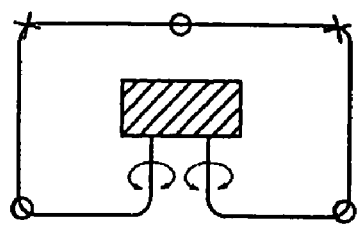
FIG. 9 is a diagram showing structural examples derived from FIG. 5(c).
Figure 9:
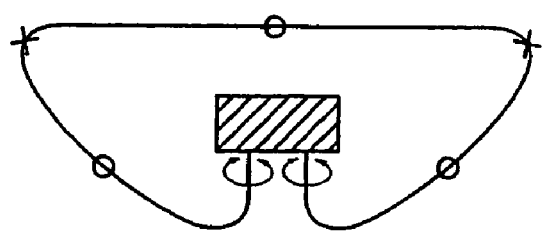
Figure 9:
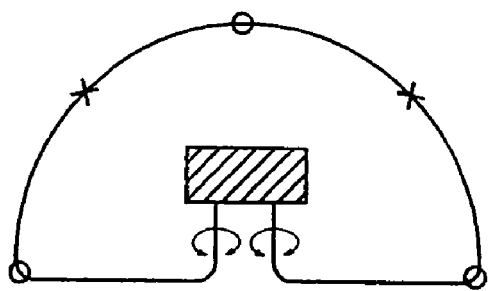
Figure 9:
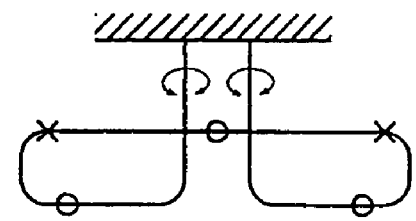

Of the structural examples shown in FIGS. 3 through 9, the one shown FIG. 8(b) provides a satisfactory Coriolis force detection sensitivity. In this structural example, the fixed ends on the upstream and downstream sides are in close proximity to each other in the same plane, and the number of times that the tube is bent is small, making it possible to make the tube frequency relatively high.

In particular, as a Coriolis flowmeter in which vibration leakage is mitigated with a single flow tube structure and in which tertiary mode drive is effected in order to secure the requisite instrumental error performance (i.e. a tertiary mode vibration type Coriolis flowmeter), the T-shaped configuration shown in FIG. 8(b) is selected as the most superior structural example in which the bending stress is converted into twisting stress in the vicinity of the fixed ends, making it possible to reduce vibration leakage. To define the geometrical conditions thereof, an illustration will be given with reference to FIG. 10. The specific geometrical conditions for this flow tube configuration are as follows.

In a flow tube extending perpendicularly from the plane containing the inlet port and the outlet port, assuming that the width of the flow tube (i.e. the width of the flow tube body part) is W, and that the height of the flow tube (i.e. the height of the flow tube body part) is H, the aspect ratio H/W is in the following range: 0.03 (which is determined from the tube bending radius, vibration frequency, etc.)<H/W<1 (due to the adoption of a laterally elongated configuration since angular displacement can then be easily imparted to the added tube paths described below and, further, since it is necessary to increase the frequency to make it easier to obtain a phase difference).

The lower limit of the ratio of the width w at the fixed ends of the added flow tubes (i.e. the paired leg parts) to the flow tube width W is 1/200 (=0.005) since the width w does not become smaller than the tube diameter D, and the appropriate upper limit of W/D is W/D<200 in view of the rigidity of the entire flow tube, frequency, etc. Further, when the upper limit as obtained through FEM analysis is 0.48 or less, the conversion of bending displacement of the flow tube into angular displacement is effected efficiently, and the result is proven by the reduction in displacement in the vicinity of the fixed ends. Thus, the condition for w/W was determined as follows: 1/200 (=0.005)<w/W<0.48.

In determining the length ht of the added tube paths under the above condition, the following were selected: w/W=0.19, H/W=0.21, W/D=48.68, and t/D=0.046, and the optimum value thereof was determined through FEM analysis. Thus, it was found out that when the ratio ht/H of the height ht of the added tube paths to the height of the flow tube (i.e. the height of the body part) H is approximately 2.50, the efficiency in the conversion from bending to twisting is satisfactory, and it is possible to obtain stable characteristics. Further, it was found out that when ht/H is 2.75 or more, the bending rigidity of the added tube paths, that is, the leg parts, is reduced, so that it becomes rather difficult to obtain the requisite tertiary mode vibration for the flow tube. On the other hand, the lower limit of ht/H may be as follows: 0<ht/H. Here, since H/D<50 and the minimum value of ht is 3D, which is the same as the minimum value of the bending radius, ht/H is 3/50=0.06. Thus, the condition for ht/H is as follows: 0<ht/H<2.75, and the optimum condition is as follows: 0.06<ht/H<2.75.

The above conditions will be discussed in more detail.

Regarding the bending radius R of the flow tube, from the viewpoint of resistance to pressure, the High Pressure Gas Storage Society provides the formula: R=4D (D represents a tube diameter) as a standard. However, it has been known that, from the viewpoint of practical use, substantially no problem in terms of pressure characteristic for a Coriolis flowmeter is involved when R is approximately 3D. In view of this, the lower limit of the bending radius R of the flow tube is defined as 3D or more. Here, regarding the condition for the width W of the flow tube, since the distance w between the fixed ends is not less than the tube diameter D considered as a reference, 13<W/D (see FIG. 11). Further, the upper limit of W/D is preferably in a range of W/D<200, in view of the rigidity of the entire flow tube, frequency, etc. Thus, 13<W/D<200.

Regarding the condition for the height of the flow tube (i.e. the height of the body part) H, a lower limit thereof is as follows: 6<H/D, where D is the tube diameter. From the viewpoint of the rigidity of the flow tube as a whole, frequency, etc., the upper limit of H/D is preferably in a range: H/D<50. Thus, 6<H/D<50.

Regarding the width w of the added tube paths (i.e. leg parts) at the fixed ends, when considered with the flow tube width W as a reference, since the width w does not become less than the tube diameter D, and the upper limit of W/D is preferably in the range of W/D<200 from the viewpoint of the rigidity of the entire flow tube, frequency, etc., the width w is 1/200 (=0.005). The lower limit is in the range of 200<W/D, since D=w, and 1/200 (0.005)<w/W. When the upper limit as obtained through FEM analysis is 0.48 or less, the conversion from the bending displacement into angular displacement of the flow tube is effected efficiently, and the result was proved also from a reduction in the displacement in the vicinity of the fixed ends. Thus, the condition for w/W was determined as follows: 1/200 (=0.005)<w/W<0.48.

Figure 12:
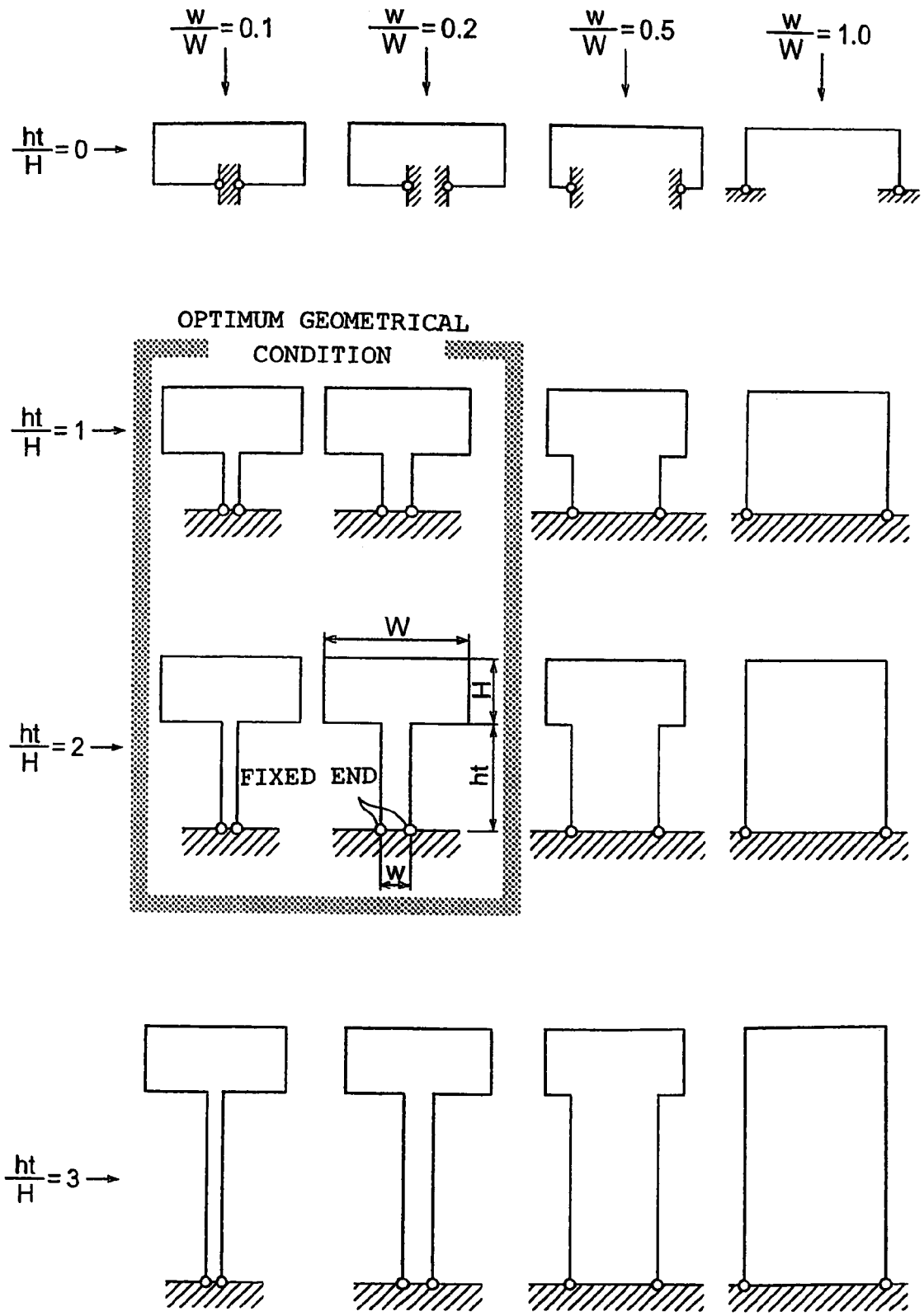
FIG. 12 is a conceptual system diagram for showing optimum geometrical conditions.

Here, an illustration will be given with reference to FIG. 12. FIG. 12 is a conceptual system drawing showing an optimum geometrical condition as determined by the ratio w/W of the width w at the fixed ends to the width W of the flow tube, and by the ratio ht/H of the height ht of the added tube paths to the height H of the flow tube. Here, a case is shown in which H/W=0.5. In the drawing, the optimum geometrical condition is framed.

Figure 13:
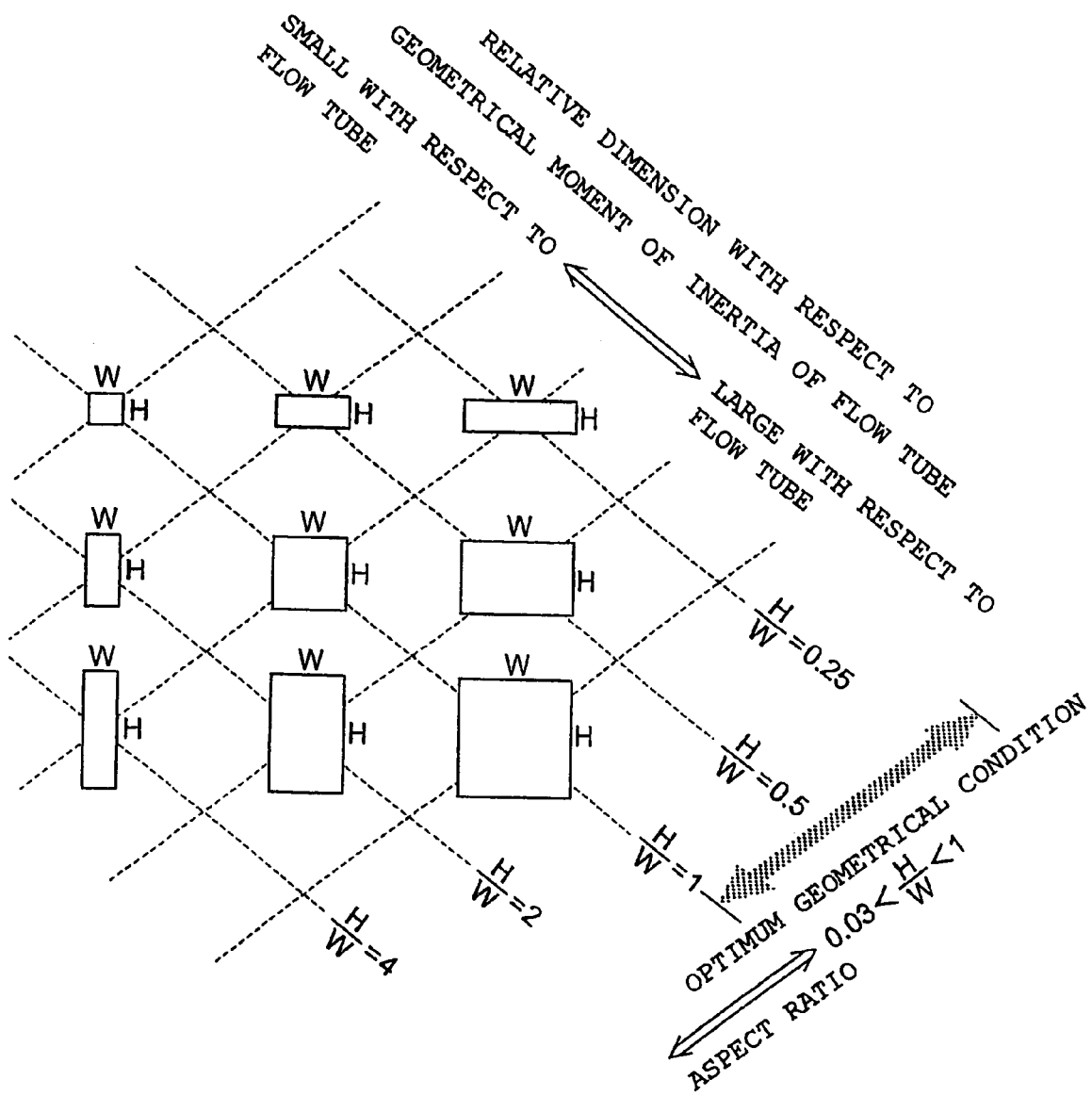
FIG. 13 is a conceptual drawing for explaining aspect ratio H/W.

FIG. 13 is a conceptual drawing showing combinations of the varied width W and the height H of the flow tube. Dashed lines extending downwardly to the right indicate combinations in which the aspect ratio H/W is the same. As the dashed lines extend downwardly to the right, the relative dimension with respect to the flow tube increases, with the geometrical configuration remaining the same.

From the above conditions, 13<W/D<200 and 6<H/D<50, the aspect ratio H/W is in a following range: 0.03<H/W<3.85. To increase the frequency and make it easier to obtain a phase difference, a laterally elongated configuration is required. Thus, the value of its upper limit was set to 1. Thus, 0.03<H/W<1. In determining the ratio w/W of the width w at the fixed ends of the added tube paths to the width W of the flow tube, and the length ht of the added tube paths, the following values, H/W=0.21 and W/D=48.68, and a material SUS316L satisfying the above conditions are selected as the geometrical conditions, and the optimum value thereof is determined through FEM analysis.

Figure 10:
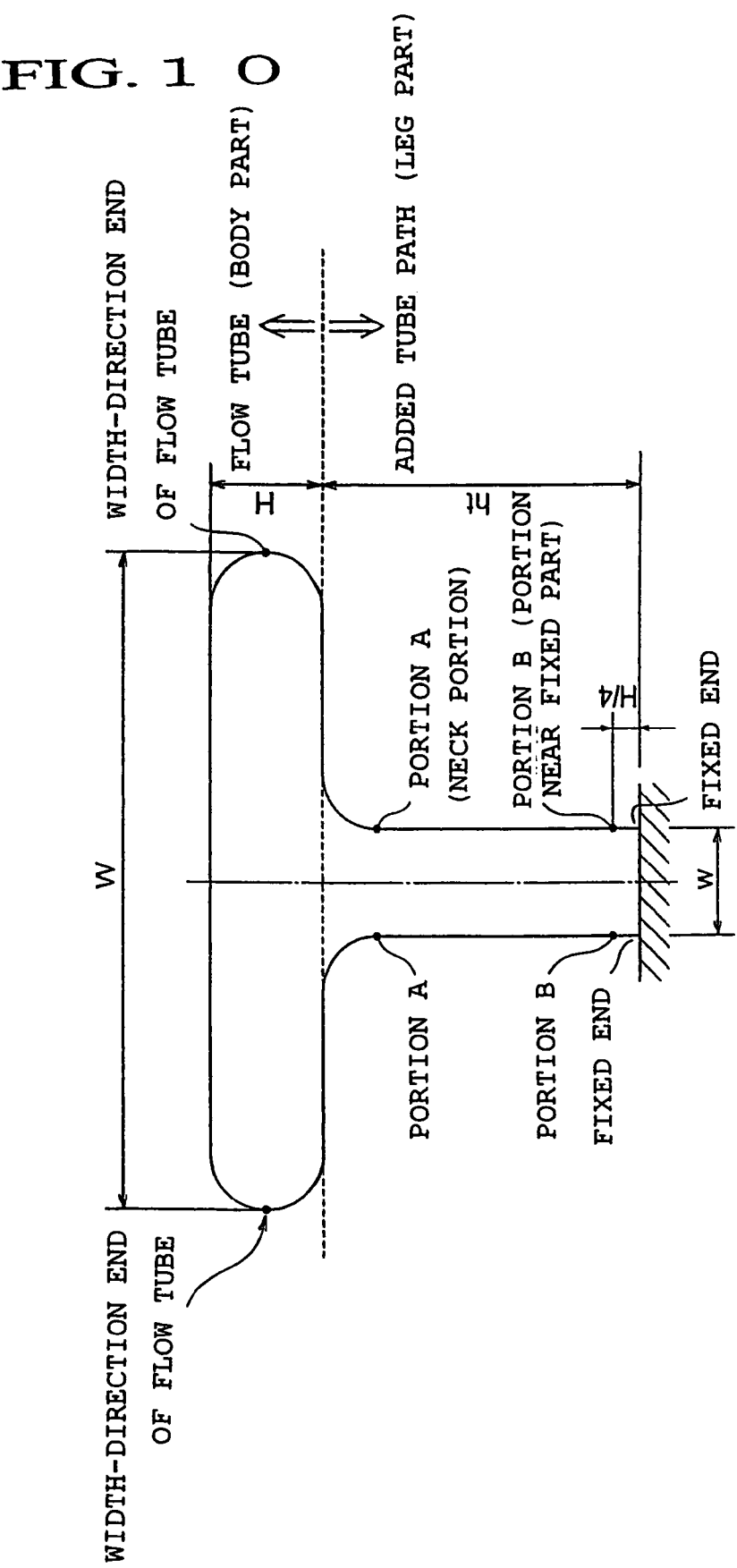
FIG. 10 is an explanatory view for defining geometrical conditions.
Figure 11:
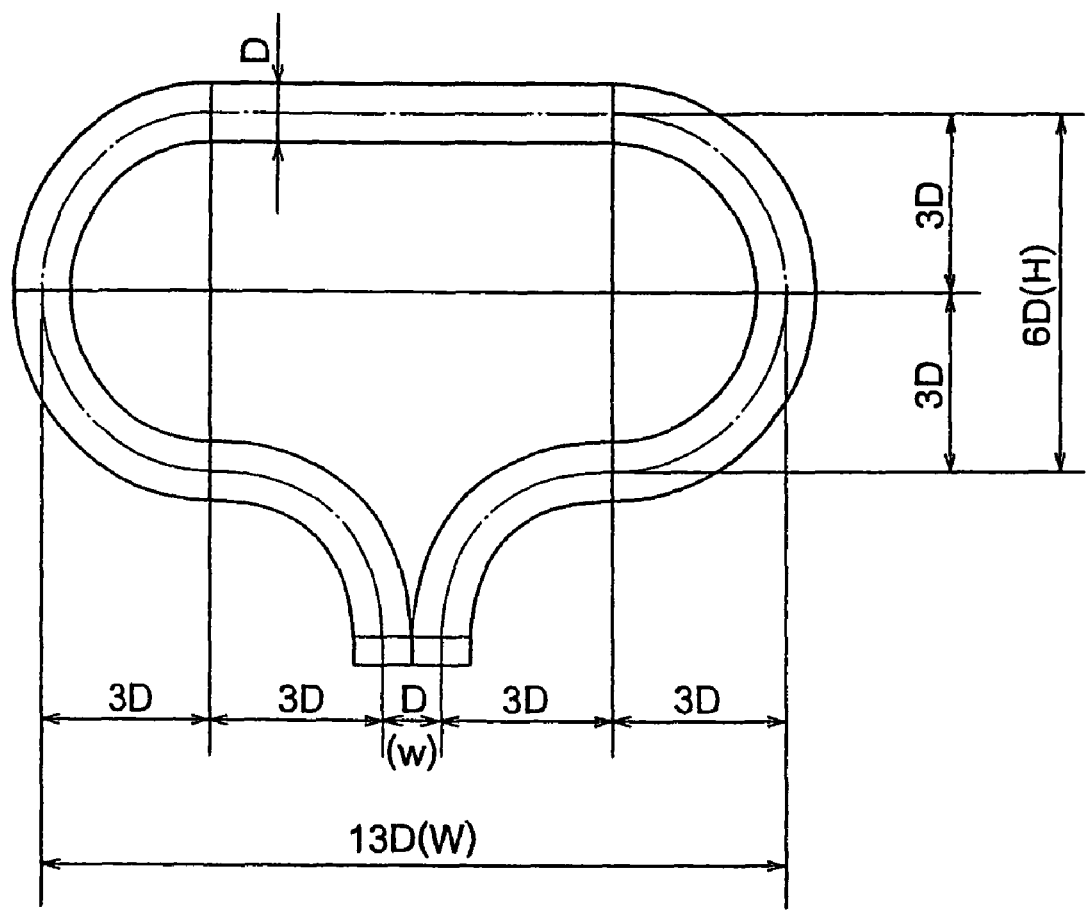
FIG. 11 is an explanatory view related to tube diameter.
Figure 14:
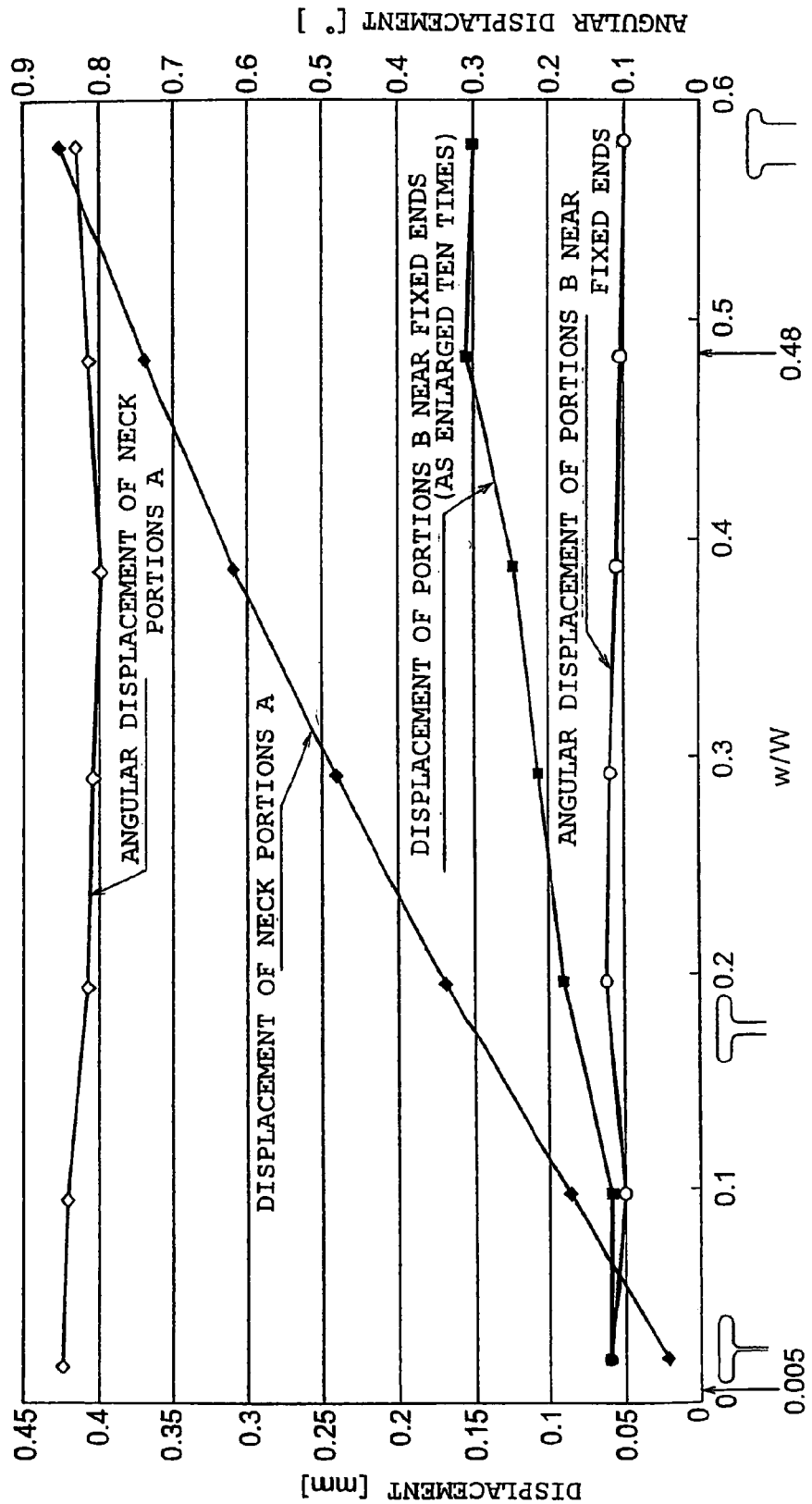
FIG. 14 is a graph showing FEM analysis results.
Figure 15:
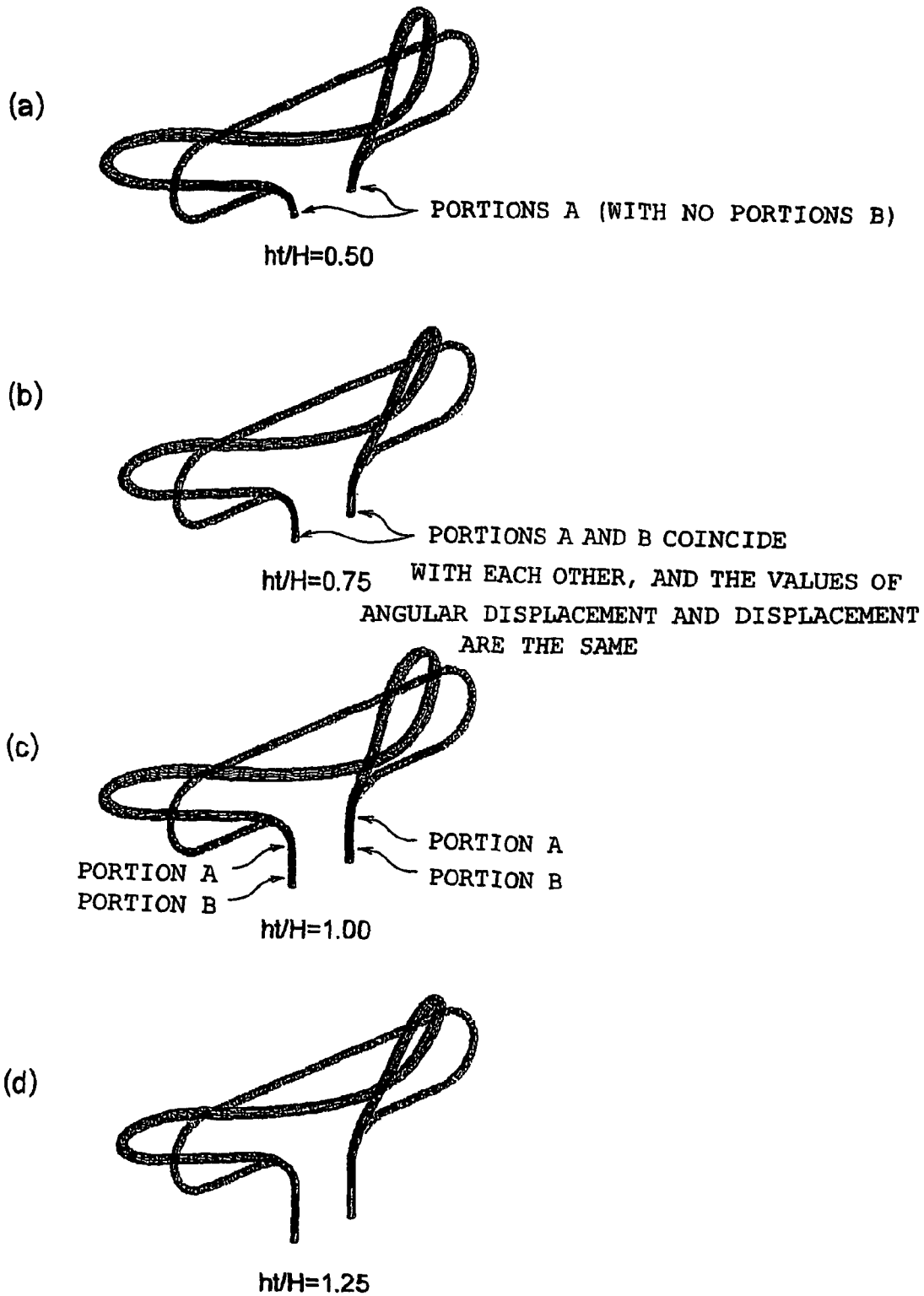
FIG. 15 is a diagram showing FEM analysis results (when ht/H=0.50 to 1.25).
Figure 16:
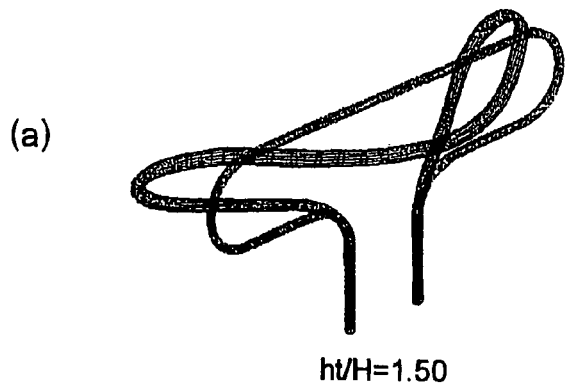
FIG. 16 is a diagram showing FEM analysis results (when ht/H=1.50 to 2.25).
Figure 16:
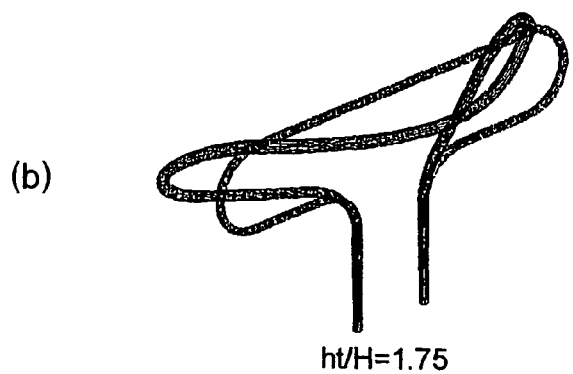
Figure 16:
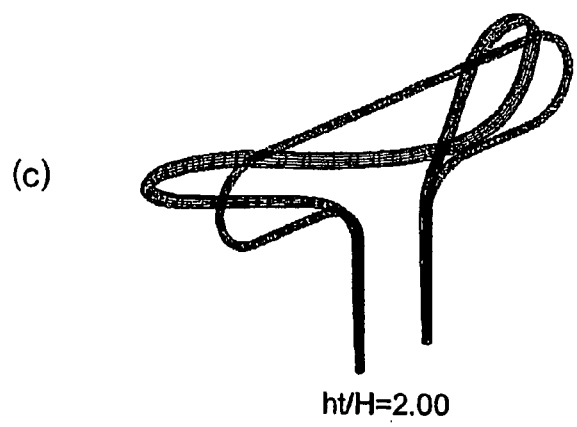
Figure 16:
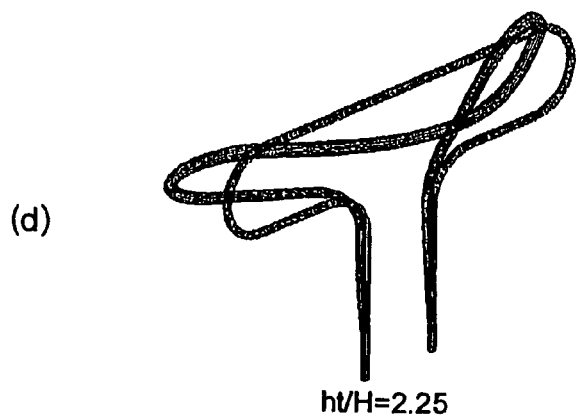
Figure 17:
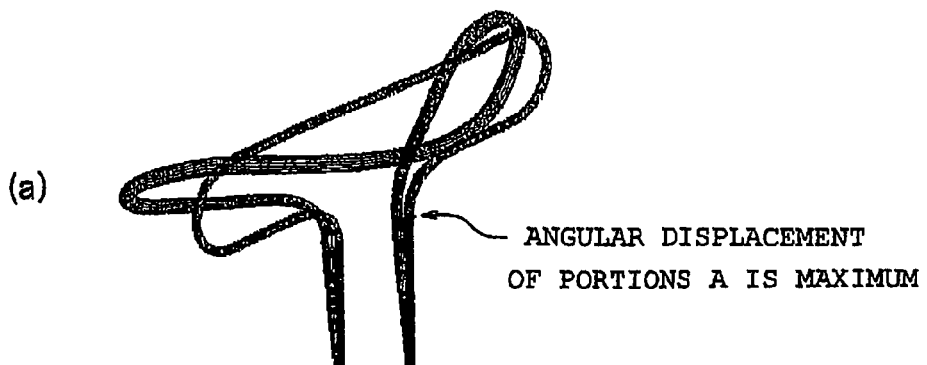
FIG. 17 is a diagram showing FEM analysis results (when ht/H=2.50 to 3.00).
Figure 17:
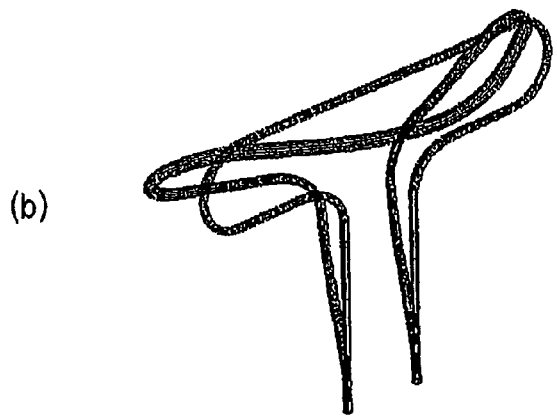
Figure 17:
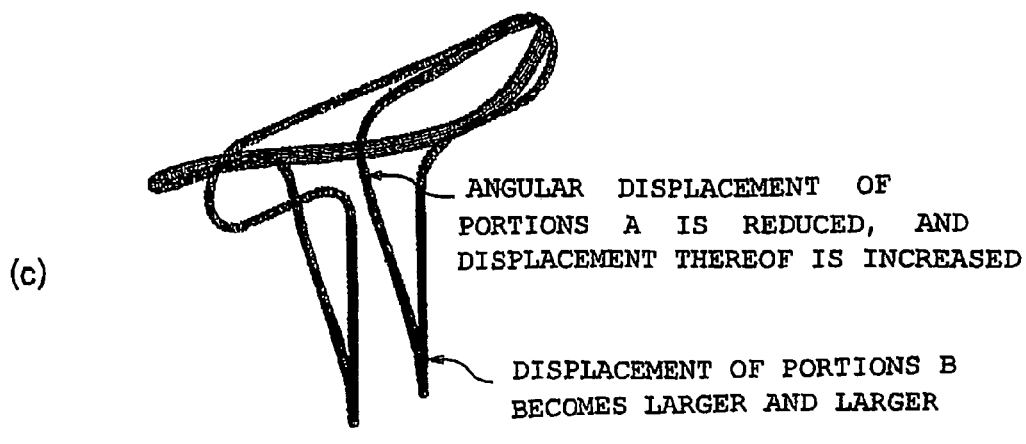
Figure 18:
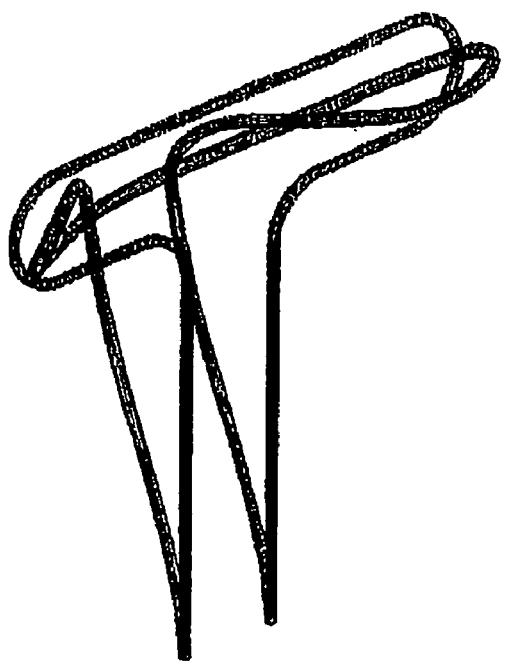
FIG. 18 is a diagram showing FEM analysis results (when ht/H=4.00 to 5.00).
Figure 18:
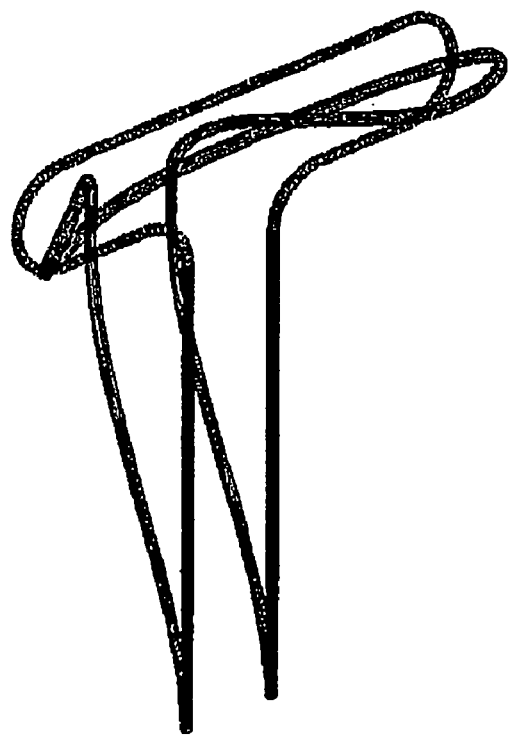

FIG. 14 shows the displacement and the angular displacement at the neck portions A and the portions B near the fixed ends with respect to the width w of the added tube paths as obtained through FEM analysis. The positions of the neck portions A and those of the portions B near the fixed ends are shown in FIG. 10. The horizontal axis in FIG. 14 indicates the ratio w/W of the width w at the fixed ends to the width W of the flow tube. As a typical example of the geometrical condition, an aspect ratio of H/W=0.21 and a ratio ht/H of the height ht of the added tube paths to the height H of the flow tube of 2.42 were adopted as fixed values. The amplitude of the flow tube at the lateral ends is 1 mm. Since the displacement amount at the positions B near the fixed ends is minute, this amount is represented as enlarged ten times. The ratio w/W of the width w at the fixed ends to the width W of the flow tube was varied from 0.02 to 0.58.

The displacement of the neck portions A is greatly influenced by the ratio w/W of the width w at the fixed ends to the width W of the flow tube. As the width ratio w/W increases, the displacement increases from 0.024 mm to approximately 0.4 mm. On the other hand, regarding the angular displacement of the neck portions A, when the ratio w/W of the width w at the fixed ends to the width W of the flow tube ranges from 0.02 to 0.58, the angular displacement of the neck portions A ranges from 0.8° to 0.85°, that is, substantially constant. Minute observation, however, shows that the angular displacement is reduced when the w/W is approximately 0.2 to 0.48.

The displacement at the portions B near the fixed ends (of which the positions are at a distance of 1/4H from the fixed ends) (represented in the drawing as enlarged ten times) is as small as approximately 0.006 mm when w/W=0.02, but gradually approaches a fixed value of 0.015 mm when w/W increases to attain a value of approximately 0.48. On the other hand, the angular displacement at the portions B near the fixed ends does not substantially depend on w/W but is suppressed to a level of approximately 0.1°.

For a reduction in vibration leakage and a reduction in the stress at the vibration base portions, it is important that the displacement at the portions B near the fixed ends should be small, so that the optimum condition for w/W is as follows: 1/200 (=0.005)<w/W<0.48.

FIGS. 15(a) through 18(b) show the results of FEM analysis of tertiary mode drive models of the T-shaped tube. The drawings show the maximum amplitude conditions when the length ht/H of the leg parts of the T-shaped tube is varied, with the end portions in the width direction of the flow tube being at a fixed amplitude of 1 mm (depiction of the amplitude in the drawing is somewhat exaggerated). Here, the aspect ratio H/W when the width of the flow tube is W and the height of the flow tube is H, is 0.21, and the ratio w/W of the width w at the fixed ends to the width W of the flow tube was a fixed value of 0.19.

In FIG. 15(a), ht/H=0.50; in FIG. 15(b), ht/H=0.75; in FIG. 15(c), ht/H=1.00; in FIG. 15(d), ht/H=1.25; in FIG. 16(a), ht/H=1.50; in FIG. 16(b), ht/H=1.75; in FIG. 16(c), ht/H=2.00; in FIG. 16(d), ht/H=2.25; in FIG. 17(a), ht/H=2.50; in FIG. 17(b), ht/H=2.75; in FIG. 17(c), ht/H=3.00; in FIG. 18(a), ht/H=4.00; and in FIG. 18(b), ht/H=5.00.

As compared with the cases in which the value of ht/H is less than 4.00, in the case of FIG. 18(a), in which ht/H=4.00, and in the case of FIG. 18(b), in which ht/H=5.00, the linear portion at the apex of the flow tube is scarcely deflected. A Coriolis force is generated only through angular displacement when a flow tube vibrates as the flow tube of a Coriolis flowmeter, so that no Coriolis force is generated through parallel movement of the flow tube alone. Thus, the case of FIG. 18(a), in which ht/H=4.00, and of FIG. 18(b), in which ht/H=5.00, are not suitable for a Coriolis flowmeter.

When ht/H is increased, and the added tube paths, that is, the leg parts, are elongated, the two nodes in a tertiary mode vibration move respectively from the linear portion of the apex toward the fixed ends on the upstream and downstream sides. The positions of the two nodes pass the maximum width portion of the tube between a stage where ht/H=3.00 and a stage where ht/H=4.00. With this condition as a boundary, when ht/H is small, the two nodes of the vibration become closer to the linear portion side of the apex, and when ht/H is large, the nodes of the vibration approach the fixed end side on the upstream and downstream sides.

Figure 19:
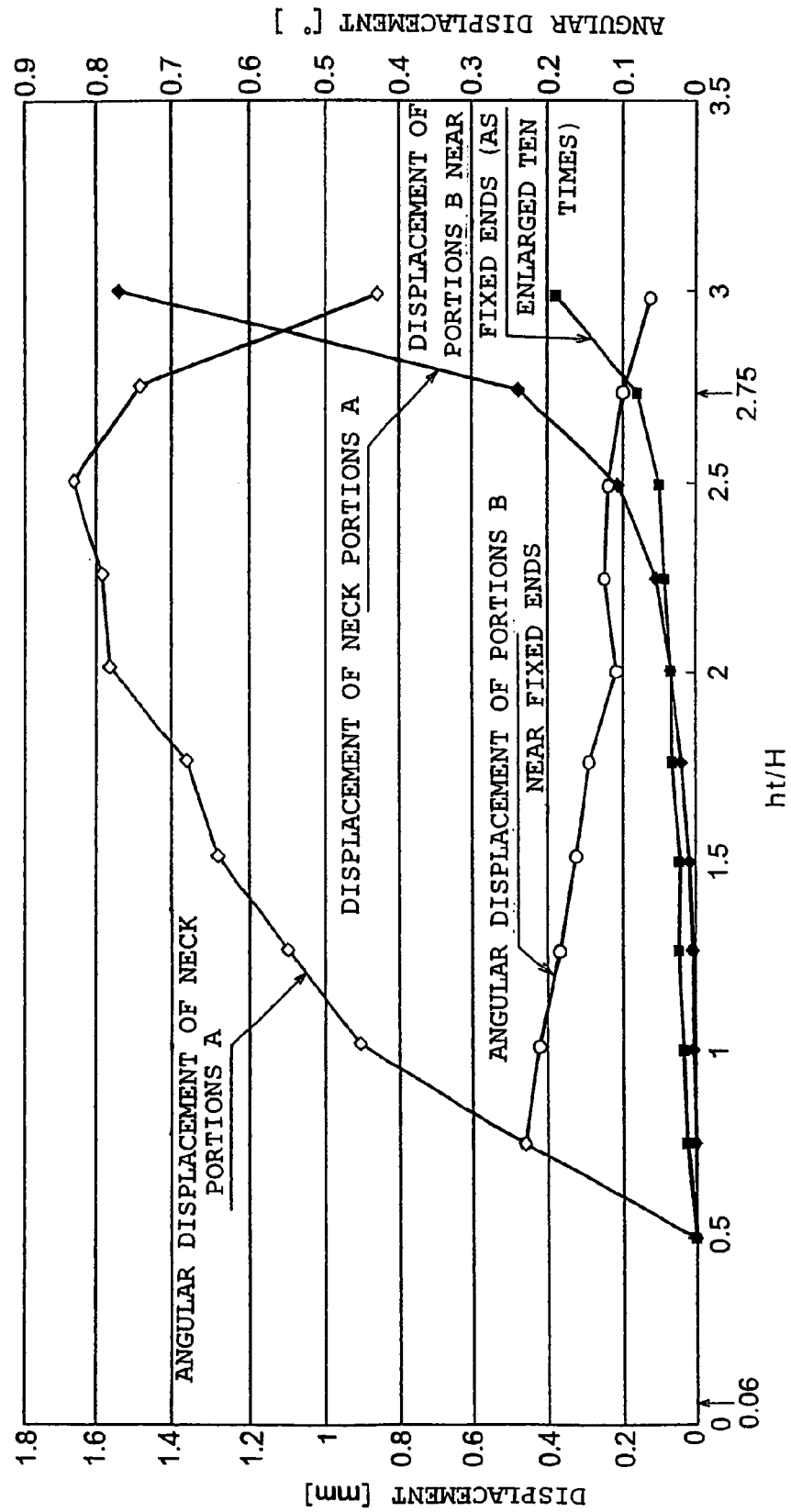
FIG. 19 is a graph showing displacement amounts and angular displacement amounts obtained through FEM analysis.

FIG. 19 shows the displacement amounts and angular displacement amounts of the neck portions A and the fixed end portions B (situated at a distance of 1/4H from the fixed ends, the relative distance from the flow tube varying; see FIG. 10) in the T-shaped flow tubes of the dimensions as shown in FIGS. 15(a) through 17(c) as obtained through FEM analysis. The displacement amounts of the portions B near the fixed ends are minute, and therefore are enlarged ten times in their representation. The aspect ratio H/W is 0.21, and the ratio w/W of the width w at the fixed ends to the width W of the flow tube is a fixed value of 0.19. The value of ht/H was increased stepwise from 0.50 to 3.00. When the value of ht/H is increased from ht/H=0.50, the displacement amount at the neck portions A increases gently from 0 mm. When the level around which ht/H=2.50 (0.2 mm) is exceeded, the displacement amount increases abruptly, and when ht/H=3.00, the displacement amount is 1.55 mm. On the other hand, the angular displacement amount at the neck portions rises abruptly from 0° when the value of ht/H is increased, and when the value of ht/H is approximately 2.50, attains 0.83°. Beyond that level, the angular displacement amount is reduced abruptly, and when the value of ht/H=3.00, is reduced to a level of approximately 0.43°.

When the value of ht/H is increased from the stage where ht/H=0.75 (minimum value), the displacement amount at the portions B near the fixed ends increases gently from 0 mm. However, the amount is minute (therefore, is enlarged ten times in the drawing). Even when ht/H=3.00, the displacement amount is as small as approximately 0.038 mm. As can be seen from the graph, up to the stage where ht/H=2.50, more specifically, up to the stage where ht/H=2.75, the displacement amount is suppressed to a level not larger than 0.01 mm. On the other hand, the angular displacement at the portions B near the fixed ends is at a maximum value of 0.23°, when ht/H=0.75 (minimum value). When the value of ht/H is increased, the angular displacement is reduced substantially linearly, and when ht/H=3.00, is approximately 0.07°.

When ht/H=2.50, the angular displacement of the neck portions A is maximum, and the angular displacement and the displacement at the portions B in the vicinity of the fixed ends are small, with the displacement at the neck portions A being allowed to be a relatively small value. Thus, it can be seen that the vibration in the bending direction is efficiently converted into twisting vibration, and the displacement and angular displacement transmitted to the fixed parts are allowed to be minute. This phenomenon is due to the fact that the added tube paths (i.e. leg parts) do not simply fall at the time of a tertiary mode vibration but are displaced in the direction (i.e. neutral direction) opposite to the falling direction as the flow tube (i.e. body part) is approached (see FIGS. 17(b) and 17(c)). Thus, it can be seen that an ht/H ratio of approximately 2.50 is the optimum condition for the height of the tube paths added. Further, it was found out that when the value of ht/H is 2.75 or more, the bending rigidity of the added tube paths (i.e. leg parts) is reduced, making it difficult to attain the requisite tertiary mode vibration of the flow tube. On the other hand, H/D<50, and the minimum value of ht is 3D, which is the same as the minimum value of the bending radius, so that the lower limit of ht/H is 3/50=0.06. Thus, the optimum condition for ht/H is as follows: 0.06<ht/H<2.75.

Figure 20:
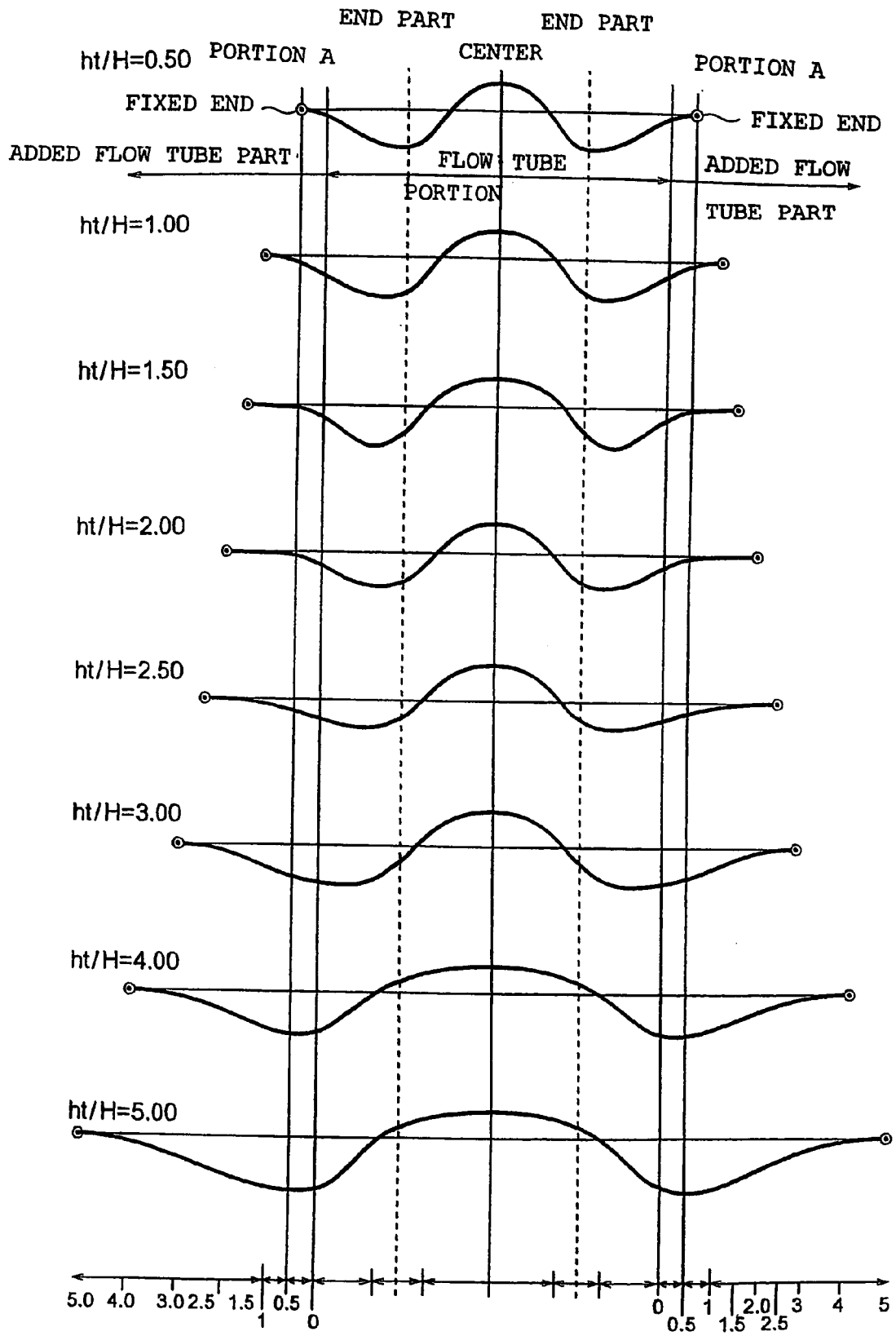
FIG. 20 is a conceptual drawing showing a tertiary mode vibration at maximum displacement as drawn into a single tube.

FIG. 20 is a conceptual drawing showing a tertiary mode vibration of a T-shaped flow tube at maximum displacement as drawn into a single tube, and is substantially copied from FEM analysis results. FIG. 20 successively shows changes from the state in which ht/H=0.50 to the state in which ht/H=5.00. It can be seen therefrom that when ht/H is 3.00 or more, the bending displacement has been propagated to the portions near both fixed ends. Further, it can be seen that when ht/H is approximately 2.50, the bending displacement in the vicinity of the fixed ends has been reduced.

It goes without saying that the present invention allows various modifications without departing from the gist thereof.

The invention claimed is:

1. A tertiary mode vibration type Coriolis flowmeter comprising:
   a flow tube shaped to lie in a plane, said flow tube having a substantially elliptical loop-shaped body part and a pair of parallel leg parts connected to said substantially elliptical loop-shaped body part so as to form a T-shaped configuration in plan view, said leg parts being continuous with respective end parts of said substantially elliptical loop-shaped body part and configured to be deflected in a direction substantially orthogonal to a vibrating direction of said end parts and to an outside of said end parts, said leg parts each having a respective fixed end part for supporting said flow tube;
   a drive device for driving said flow tube by a bending vibration in a tertiary mode;

a pair of vibration detection sensors for detecting a phase difference in proportion to a Coriolis force acting on said flow tube;

a casing having a structure resistant to bending and torsion, said flow tube and said drive device being accommodated within said casing; and a stationary member in said casing and oriented so as to be parallel to said plane of said flow tube, a part of said stationary member being fixed to said casing;

wherein said fixed end part of each of said leg parts of said flow tube is supported and fixed at an inlet port side and an outlet port side by support portions mounted to said stationary member.

2. The tertiary mode vibration type Coriolis flowmeter of claim 1, wherein said fixed end parts of said leg parts are arranged at positions in close proximity to each other within said plane of said flow tube.

3. The tertiary mode vibration type Coriolis flowmeter of claim 2, wherein the following conditions are satisfied:

$$0.03 < H/W < 1; \quad (1)$$

$$0.005 < w/W < 0.48; \text{ and} \quad (2)$$

$$0 < ht/H < 2.75; \quad (3)$$

wherein W is a width of said substantially elliptical loop-shaped body part, H is a height of said substantially elliptical loop-shaped body part, ht is a height of said pair of leg parts, w is a fixed end width consisting of a distance between said fixed end parts, H/W is a ratio of said height H of said substantially elliptical loop-shaped body part to said width W of said substantially elliptical loop-shaped body part, w/W is a ratio of said fixed end width w to said width W of said substantially elliptical loop-shaped body part, and ht/H is a ratio of said height ht of said pair of leg parts to said height H of said substantially elliptical loop-shaped body part.

4. The tertiary mode vibration type Coriolis flowmeter of claim 1, wherein the following conditions are satisfied:

$$0.03 < H/W < 1; \quad (1)$$

$$0.005 < w/W < 0.48; \text{ and} \quad (2)$$

$$0 < ht/H < 2.75; \quad (3)$$

wherein W is a width of said substantially elliptical loop-shaped body part, H is a height of said substantially elliptical loop-shaped body part, ht is a height of said pair of leg parts, w is a fixed end width consisting of a distance between said fixed end parts, H/W is a ratio of said height H of said substantially elliptical loop-shaped body part to said width W of said substantially elliptical loop-shaped body part, w/W is a ratio of said fixed end width w to said width W of said substantially elliptical loop-shaped body part, and ht/H is a ratio of said height ht of said pair of leg parts to said height H of said substantially elliptical loop-shaped body part.

5. The tertiary mode vibration type Coriolis flowmeter of claim 1, wherein said flow tube is shaped to lie entirely in said plane.

* * * * *